United States Patent [19]
Jones

[11] Patent Number: 5,277,523
[45] Date of Patent: Jan. 11, 1994

[54] PRECISION DEPTH SPINDLE

[75] Inventor: Joel Jones, Windsor, Canada

[73] Assignee: Tri-Way Machine Ltd., Ontario, Canada

[21] Appl. No.: 933,806

[22] Filed: Aug. 24, 1992

[51] Int. Cl.⁵ .............................................. B23B 49/00
[52] U.S. Cl. ......................................... 408/14; 408/12; 408/241 S; 408/53; 409/184
[58] Field of Search .............. 408/8, 10–14, 241.5, 124, 42, 43, 53; 409/171, 184, 218

[56] References Cited

U.S. PATENT DOCUMENTS

| | | | |
|---|---|---|---|
| 3,516,327 | 6/1970 | Wilson | 90/11 |
| 4,273,481 | 6/1981 | Corley et al. | 408/14 |
| 4,436,460 | 3/1984 | Powell | 408/14 |
| 4,530,625 | 6/1985 | Corley et al. | 408/14 |

FOREIGN PATENT DOCUMENTS 137507  8/1983  Japan ................................ 408/14

*Primary Examiner*—Steven C. Bishop
*Attorney, Agent, or Firm*—Shoemaker and Mattarie, Ltd.

[57] ABSTRACT

A precision depth spindle is mounted to rotate within a cartridge but is restrained against axial movement with respect to the cartridge. The cartridge is mounted for axial sliding movement within a housing, but cannot rotate with respect to the housing. A tool chuck is fixed to one end of the spindle for movement with the spindle, the tool chuck supporting a cutting tool. A spindle stop is mounted to the tool chuck and can rotate with respect to the chuck. This allows the spindle stop to be maintained stationary while the tool chuck and the cutting tool rotate. The spindle stop is finely adjustable axially with respect to the tool chuck, thus determining the depth to which the cutting tool will enter a workpiece. The cartridge has a limited axial motion range with respect to the housing, and both the spindle and cartridge are urged toward the workpiece with respect to the housing by a suitable spring or pressure means.

15 Claims, 5 Drawing Sheets

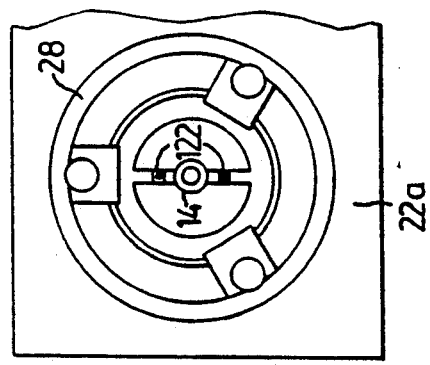
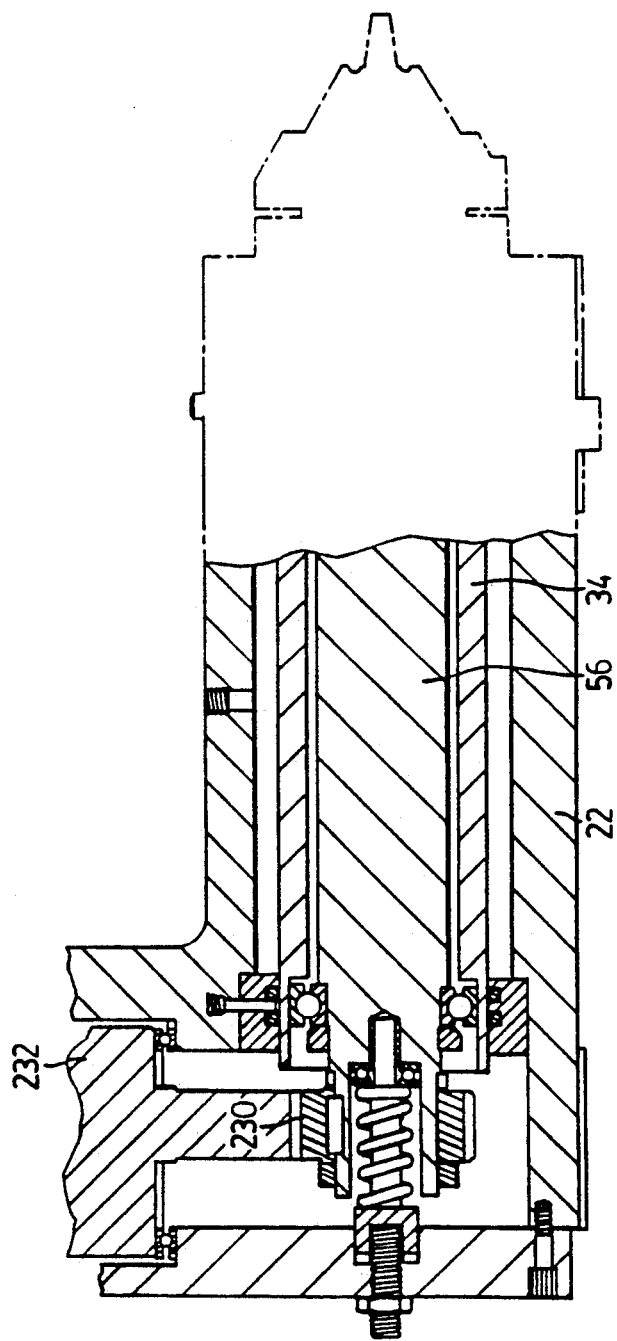
FIG. 4b
FIG. 4a

PRECISION DEPTH SPINDLE

This invention relates generally to the area of automated, production line machining stations, and has to do particularly with a design for a precision depth boring spindle for use in such machining stations.

BACKGROUND OF THIS INVENTION

In certain operations involving automated machines for drilling, boring and other operations, it is desirable to be able to control and predetermine the depth of a cut or bore hole in the workpiece, independently of the position of the control machine which advances the cutting tool.

Conventionally, this type of boring operation has been accomplished through the use of servo motor feed packs and gaging stations with feedback controls.

Typical of the prior art is U.S. Pat. No. 4,530,625 issued Jul. 23, 1985 to Corley et al., and U.S. Pat. No. 4,273,481, issued Jun. 16, 1981, also to Corley et al. Both of these prior patents utilize a spindle stop arrangement which is axially slidable with respect to the cutting bit, and which is such as to relieve hydraulic pressure utilized to drive the cutting tool into the workpiece, when the cutting bit has reached a given, predetermined depth. This is accomplished by uncovering a hydraulic passageway, or by unseating the ball of a check valve. Unfortunately, constructions of this type are not capable of depth tolerances as small as 0.001 inches.

Another patent of peripheral interest is U.S. Pat. No. 3,516,327, issued Jun. 23, 1970 to Wilson.

GENERAL DESCRIPTION OF THIS INVENTION

In view of the comments above, it is the object of one aspect of this invention to provide a precision depth spindle arrangement capable of achieving greater precision than conventional apparatus due to the fact that the spindle stop remains at a fixed axial location relative to the cutting tool, while being restrained against rotating therwith.

It is an object of a further aspect of this invention to provide a precision depth spindle which does not require feedback circuitry to gage the depth of the machined hole. More specifically, the precision depth spindle herein disclosed can be readjusted manually and reset with hand-held gages.

More particularly, this invention provides, in combination:

a housing adapted to be moved rectilinearly in a given direction toward a workpiece, the housing defining a first elongate, interior recess, an elongate cartridge within said first recess, the cartridge defining a second elongate, interior recess, an elongate spindle within said second recess, first means within the first recess mounting said cartridge for limited axial sliding movement with respect to said housing parallel to said given direction, second means restraining the cartridge from rotating with respect to the housing, third means within said second recess mounting said spindle for rotation with respect to said cartridge about a rotary axis parallel with said given direction, fourth means restraining axial displacement of the spindle with respect to the cartridge, a tool chuck fixed to one end of said spindle for movement therewith, fifth means on the tool chuck for receiving and supporting a cutting tool for movement with the tool chuck, such that spindle advancement and rotation causes advancement and rotation of the cutting tool about said rotary axis, a spindle stop mounted to said tool chuck for rotation with respect thereto about said rotary axis, the spindle stop having portions adapted to contact a workpiece, sixth means for adjusting the axial position of the spindle stop with respect to the tool chuck, seventh means for restraining rotation of the spindle stop with respect to the cartridge, and eighth means for urging the spindle and the tool chuck toward the workpiece with respect to the housing.

GENERAL DESCRIPTION OF THE DRAWINGS

One embodiment of this invention is illustrated in the accompanying drawings, in which like numerals denote like parts throughout the several views, and in which:

FIG. 1b shows a portion of a workpiece and a tapering bore made by the tool of FIG. 1a;

FIG. 2b is an end elevation of the structure shown in FIG. 2a;

FIG. 3b is a plan view of the apparatus shown in FIG. 3a;

FIG. 4a is an axial sectional view through a precision depth spindle similar to that shown in FIG. 2a, except for the drive means;

FIG. 4b is an end elevational view of the apparatus shown in FIG. 4a; and

DETAILED DESCRIPTION OF THE DRAWINGS

Figure 1B:
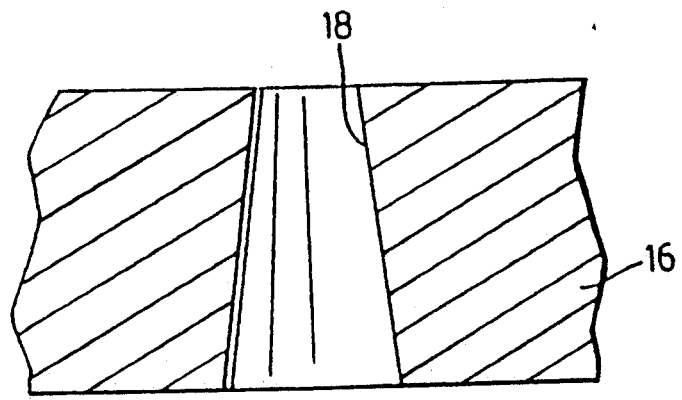
Figure 1A:
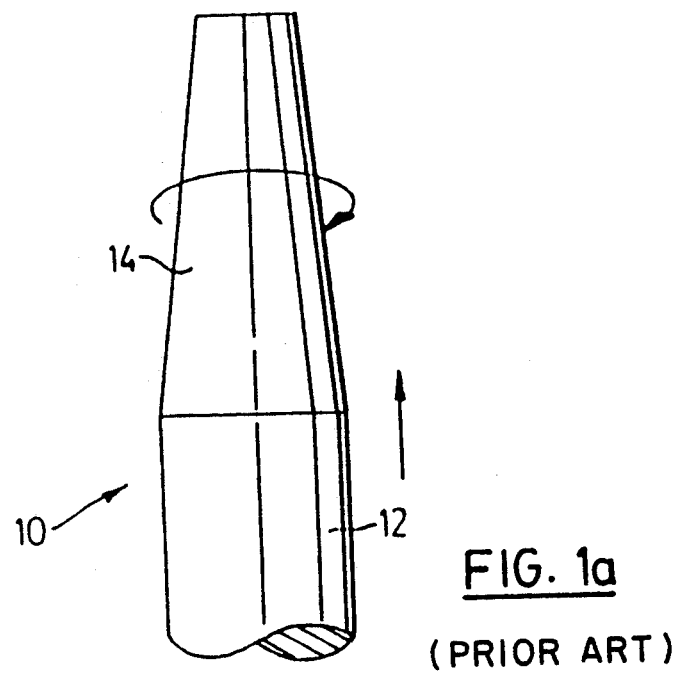
FIG. 1a shows a typical tapered tool or spot face tool.

Attention is first directed to FIG. 1a which shows a tapered tool generally at 10, having a cylindrical shank 12 and a frustoconical tool portion 14.

FIG. 1b shows a portion of a workpiece 16 having a tapered bore 18 of the kind that the tool shown in FIG. 1a is adapted to cut.

Figure 2A:
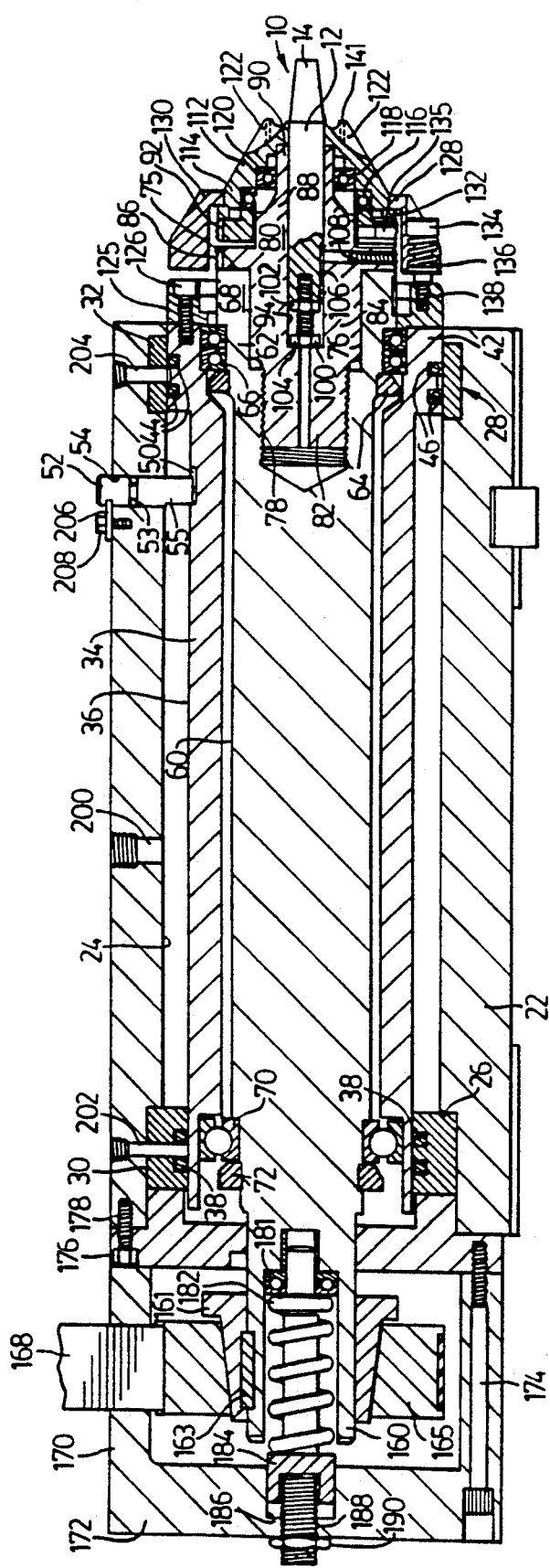
FIG. 2a is an axial sectional view through a precision depth spindle constructed in accordance with this invention and various parts cooperating therewith.

Attention is now directed to FIG. 2a which shows a precision depth spindle apparatus generally at the numeral 20. The apparatus 20 includes a housing 22 which is elongated in the left-right direction in FIG. 2a. The housing 22 may be simply a portion of a larger housing containing a number of spindles and corresponding tools, or it may be a stand-alone housing for those applications requiring only a single cutting tool.

The housing 22 defines a first elongate, interior recess 24 which is preferably, though not necessarily, cylindrical. As shown, the interior cylindrical surface of the recess 24 is outwardly stepped at 26 at the rearward (leftward) end, and has an annular recess 28 at the forward (rightward) end. The step configuration 26 at the leftward end of the housing 22 receives a bronze liner (bushing) 30, while the annular recess 28 at the rightward end receives a further bronze liner (bushing) 32.

As seen in FIG. 2a, an elongate cartridge 34 is disposed within the recess 24 of the housing 22. The cartridge 34, in the embodiment illustrated, has a cylindrical outer surface 36 which, at its leftward end, bears against the bushing 30. Seals are provided at 38 for a purpose which will become apparent subsequently.

At the rightward end of the cartridge 34, there is an outwardly stepped cylindrical portion 42 which rests against the bushing 32. The portion 42 contains two annular galleries 44 containing suitable seals 46.

The cartridge 34 is permitted a small amount of axial play with respect to the housing 22, this play being preferably no greater than0.125 inches. However, the cartridge 34 is restrained against rotation with respect to the housing 22 by virtue of a recess 50 at a localized position on the outer surface 36 of the cartridge 34, together with an anti-rotation pin 52 which extends substantially radially through a substantially radial bore 54 through the wall of the housing 22. The pin 52 has an end 55 adapted to be received within the recess 50. The recess 50 is axially elongated to a dimension somewhat greater than the axial dimension through the pin 52, but has a transverse dimension (i.e. perpendicular to the drawing paper) which is only slightly greater than the equivalent dimension of the end 55 of the pin 52, thereby to restrain the cartridge 34 against rotation with respect to the housing 22. The pin 52 is sealed by an O-ring 53 with respect to the bore 54.

FIG. 2a further shows a spindle 56 which, in the embodiment illustrated, has a central cylindrical exterior wall 60, which transitions to an outwardly multiple-stepped configuration 62 at the rightward end that receives a threaded lock nut 64 and an angular contact bearing 66. As can be seen, the bearing 66 is trapped between the lock nut 64 and a further rightward portion 68 of the spindle.

At the rearward (leftward) end of the spindle 56, the exterior wall 60 of the spindle undergoes a plurality of inward steps such that it can receive a radial bearing 70, locked in place by a further threaded lock nut 72.

The bearings 66 and 70 thus constitute means for mounting the spindle 56 for rotation with respect to the cartridge 34, while at the same time constraining the spindle 56 from moving axially with respect to the cartridge 34. In other words, the cartridge 34 and spindle 56 always remain in the same relative axial position, and both of them are adapted to shift together (to a small degree) axially with respect to the housing 22. Hence, the spindle 56 can rotate with respect to the housing, and can undergo the same degree of axial movement with respect to the housing as is permitted to the cartridge 34 by the interaction between the pin 52 and the recess 50.

At its rightward end, the spindle 56 has a flat end face 75, an axial leftward bore 76, and a threaded bore continuation 78 the latter being threaded and having a smaller diameter than the bore 76.

A tool chuck 80 has a leftward, threaded cylindrical portion 82 adapted to be tightly threaded into the threaded bore 78, and an adjacent cylindrical portion 84 adapted to achieve a snug but sliding fit in the bore 76 of the spindle 56.

Rightwardly adjacent the portion 84, the tool chuck 80 has an outwardly annular flange 86, contiguous with a forwardly projecting, externally threaded cylindrical portion 88. The latter then steps down to a forwardly projecting cylindrical portion 90 with a smooth external wall.

Mounted on the threads of the portion 88 of the tool chuck 80 is a stop adjustment collar 92.

The tool chuck 80 further has an axial cylindrical bore 94 for receiving the shank 12 of the cutting tool 10, the latter also having a tool portion 14 as described with respect to FIG. 1a.

The shank 12 has, at its leftward end, an axial, threaded bore for receiving an adjustment bolt 100 which threadably engages the shank 12, and is locked three- against by a lock nut 102. The head 104 of the bolt 100 abuts the leftward end of the bore 94. To restrain the tool 10 from rotating with respect to the tool chuck 80, a flat 106 is provided toward the rear of the shank 12, and a set screw 108 is threaded through a suitably threaded bore in the flange 86, so as to abut the flat 106 and retain the cutting tool 10 in position with respect to the tool chuck 80, and with respect to the spindle 56.

Mounted forwardly of the tool chuck 80 is a spindle stop 112 having a generally conical configuration which includes a rearward flange 114 which encloses an axial thrust bearing 116 that contacts the collar 92 and permits rotation of the collar 92 with respect to the spindle stop 112.

The spindle stop 112 also defines an annular cavity 118 for receiving a radial thrust bearing 120, the latter achieving a sliding fit over the forward cylindrical portion 90 of the tool chuck 80.

The extreme rightward portion of the spindle stop 112 is cut or machined away to leave two (or three) rightward projections 122, these being the projections adapted to contact the workpiece and thus prevent the tool from further entering the workpiece.

Still at the rightward portion of FIG. 2a, there can be seen an annular ring 125 which has provision for three machine bolts 126 to lock the ring 125 against the forward end of the cartridge 34.

Figure 2B:
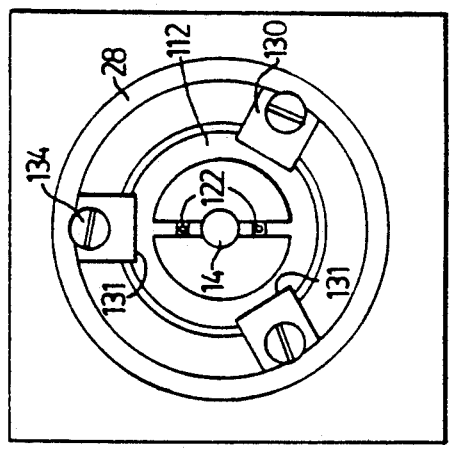

A stop retainer ring 128 is held in place by small springs under the heads of bolts 134, and retains the spindle stop 112 with tabs 130 shown in FIG. 2b as localized extensions. The flats 131 on the extensions restrain the spindle stop from rotating. The tabs 130 also hold the stop against the thrust bearing 116. The use of springs enables adjustment of the stop's position without unbolting the stop retainer ring 128.

It will thus be appreciated that adjustment of the collar 92 with respect to the tool chuck 80 (by rotating the collar 92) allows an adjustment and a pre-setting of the position of the spindle stop 112 with respect to the cutting tool 10.

As seen at bottom right in FIG. 2a, a further set screw 135 allows the collar 92 to be locked into position, once the desired position has been reached.

In a preferred embodiment, each of the projections 122 has a small axial bore 141 positioned such as to provide an orifice that will be closed by the workpiece surface when the projections 122 come into contact with that surface. By providing a source of pressurized air to the bores 141, and a means for monitoring the pressure in the bores 141, a signal can be generated to indicate that the spindle stop 112 has come into contact with the workpiece, implying that full depth of cut has been achieved by all of the spindle arrangements being utilized.

Referring now to the leftward end of FIG. 2a, it will be seen that the spindle 56 has a cylindrical tail portion 160 on which is press-fitted a conical member 161. A key 163 ensures that the member 161 and the spindle 56 always rotate together. Mounted on the member 161 is a pulley 165 around which a drive belt 168 is entrained, in order to provide rotary power to the spindle 56.

Again at the leftward end of FIG. 2a, a housing cap 170 is provided, having an outer wall substantially matching that of the housing 22. The cap also has a leftward closure end 172. The cap 170 is secured by bolts 174 to an intermediate end cap 176 which is secured to the housing 22 by a plurality of bolts 178 at uniform intervals around the periphery.

The spindle 56 supports an axial thrust bearing 181 against which the rightward end of a coil compression spring 182 rests. The leftward end of the spring 182 rests against an adjustment member 184 which slides axially in a bore 186 in the end wall 172. Adjustment of the position of the member 184 is accomplished by rotating a threaded member 188, and locking the member 188 in position with a lock nut 190. It will be understood that the compression coil spring 182 urges continuously against the leftward end of the spindle 56, thus constantly urging it to the right, which is the position in which it is shown in FIG. 2a. Note that the leftward wall of the pin 52 is in contact with the leftward end of the recess 50 in the cartridge 34.

At the upper middle of FIG. 2a, the housing 22 has a partly threaded bore 200 through which pressurized oil or air (typical pressure of 80 psi) can be admitted into the annular space between the housing 22 and the cartridge 34, which will have the effect of constantly urging the cartridge 34 and spindle 56 rightwardly with respect to the housing 22. The bore 200 thus provides an alternative to the use of the compression spring 182, for applying rightward pressure against the spindle 56. The annular seals 38 and 46 act to seal the annular space (between housing 22 and cartridge 34) when pressurized fluid is utilized. It is to be understood that this apparatus would utilize either the spring 182 or pressurized fluid through the bore 200, but not both. They are both illustrated in FIG. 2a to indicate that the user could select either one without having to alter the basic design.

The housing 22 further has a drain bore 202 communicating with the interior of the bronze bushing 30, and a further bore 204 communicating with the internal surface of the bronze bushing 32.

Returning to the upper portion of FIG. 2a, it will be noted that the pin 52 has a lateral slot in which a plate 206 is inserted. The plate 206 is held against the top of the housing 22 by a machine screw 208, thereby keeping the pin 52 in registry within the slot 50 on the exterior of the cartridge 34.

In view of the above-described construction, it will be seen that the present design offers three alternative methods for urging the spindle 56 rightwardly with respect to the housing 22, these being a compression coil spring, pressurized oil, and pressurized air.

Figure 3B:
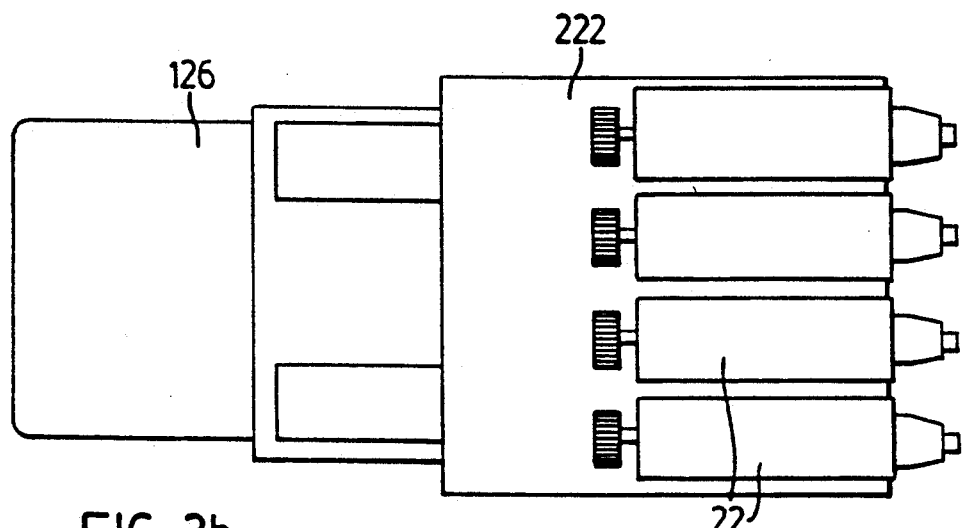
Figure 3A:
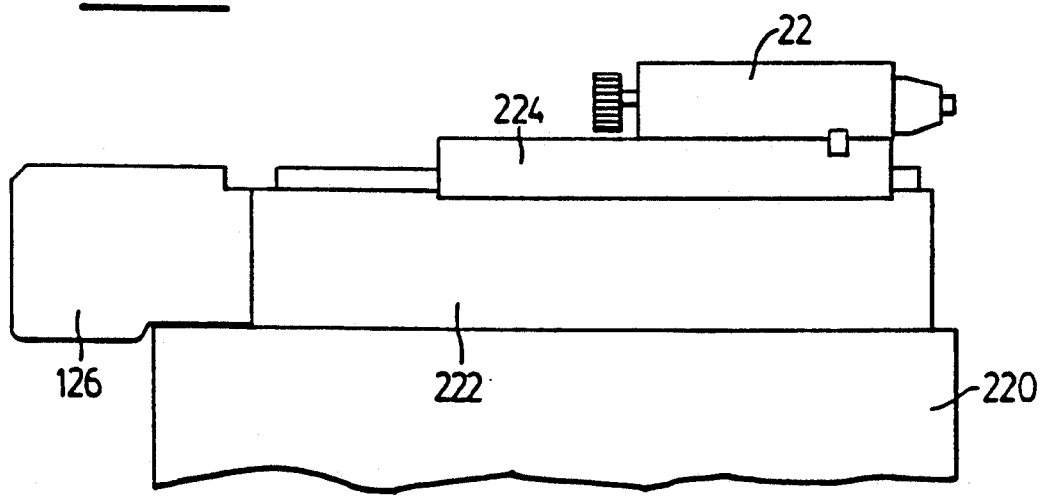
FIG. 3a is a schematic side elevational view of an apparatus utilizing the precision depth spindle of this invention.

FIG. 3a is a side elevational view of an assembly utilizing four precision depth spindles as described with reference to FIG. 2a. A main framework 220 supports a base 222 on which a slide unit 224 is adapted to reciprocate under the control of a mechanical feed pack 126. Mounted on a slide unit 224 are four housings 22, each supporting a cutting tool at the rightward end.

FIG. 4a shows an apparatus which is substantially identical to that shown in FIG. 2a, with the exception that rotation of the spindle 56 is accomplished by providing a pinion gear 230 which is keyed to the leftward end of the spindle 56, and whose teeth engage in idler gear 232 in turn driven from a drive pinion (not illustrated), thus permitting the use of this spindle design in a multiple spindle geared head.

FIG. 4b shows, in end elevation looking axially, two precision depth spindles in side-by-side alignment. The rightward end in FIG. 4b has been broken away, and it will be understood that the housing 22a in FIG. 4b can be extended rightwardly to receive any reasonable number of precision depth spindles.

Figure 5:
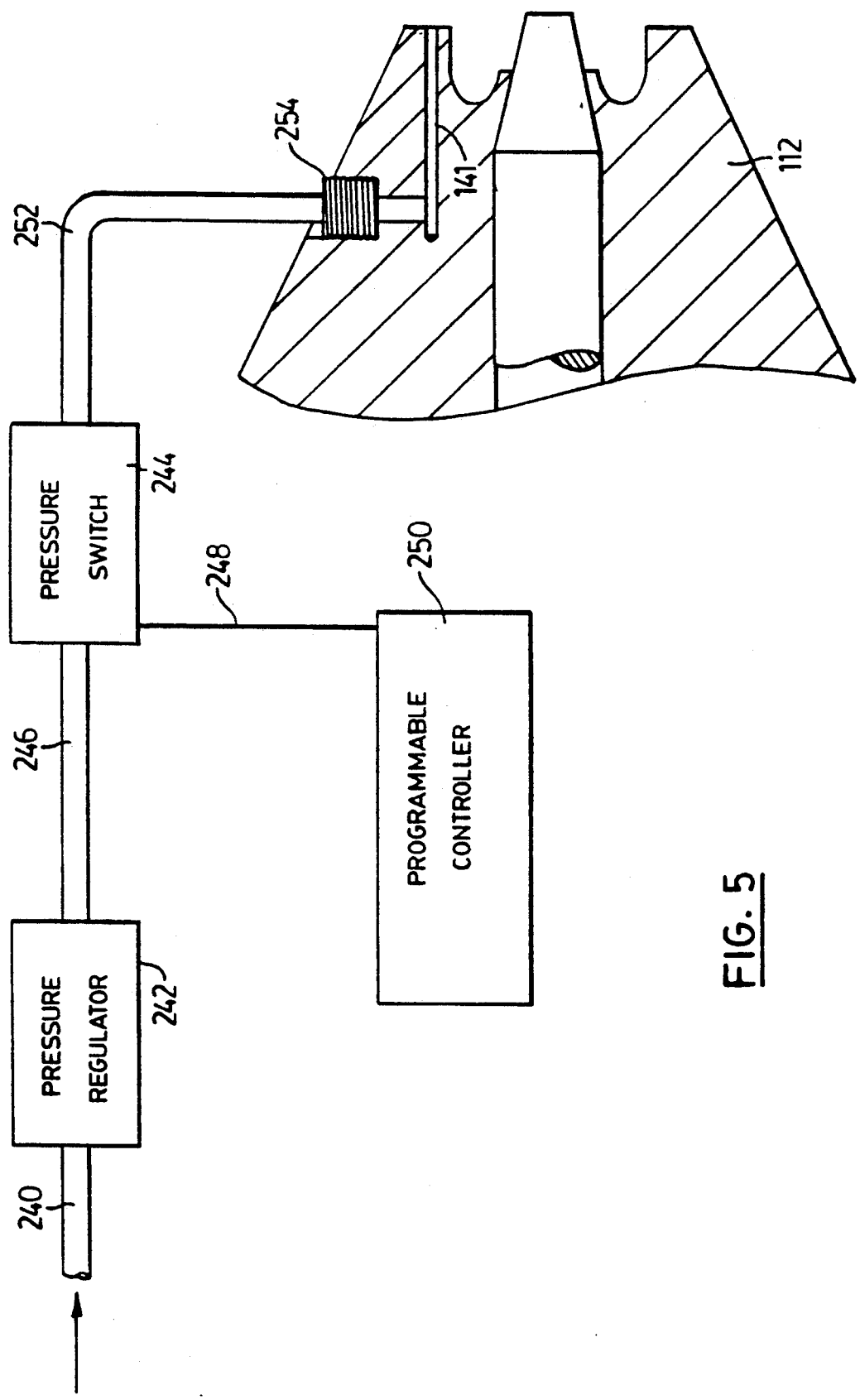
FIG. 5 is a schematic drawing of the main parts of the air pressure control system of this invention.

Attention is now directed to FIG. 5, which illustrates a schematic arrangement by which the apparatus of this invention can be controlled. In FIG. 5, air enters along conduit 240, arriving at a pressure regulator 242 from which the air, now at a controlled pressure, passes through a pressure switch 244 along a further conduit 246. The pressure switch detects changes in backpressure, and feeds this information along an electrical conduit 248 to a programmable controller 250.

From the pressure switch 244, air passes along a conduit 252, then through a connector 254 which connects to the bores 141 provided in the spindle stop 112.

In operation, preferably the spindle is allowed to "float" by only about 0.125 inches.

In use, the first operation would be to clamp the workpiece (part to be machined) in a stationary fixture at the machining station. A slide unit, such as that illustrated schematically at 224 in FIG. 3a, is mounted to travel in a straight line in order to advance the rotating tools toward and into the workpiece to produce the holes. The motion of the slide unit 224 is accomplished with a "feed pack", driven by either a hydraulic cylinder, a mechanical drive unit or a servo motor drive unit. In the case of the mechanical unit, the slide bumps into a "positive stop" at the end of its stroke, ensuring that the slide does not overtravel and damage the work fixture or tooling.

With the unit described herein, the design of the station will be such that all individual spindle stops, mounted directly on the spindles (and cartridges) will reach the workpiece when the cutting tools have reached full depth, and before the slide unit reaches the positive stop. This arrangement has the distinct advantage that the part print tolerance of the machined flat face, locating surface or gage point upon which the spindle stop rests, can be large (of the order of 0.100 inches), while all spindles have the capability of machining to within 0.001 inches depth to achieve the accuracy required, particularly for tapered holes. This is achieved, as mentioned above, through the use of the floating spindle (a float of 0.125 inches) as it allows each tool to stop against the individual part surface. The importance of this provision is due to the fact that the surface of a typical individual part will not necessarily be perfectly planar, due to part surface tolerances.

The spindle design disclosed herein presents several advantages over conventional machining systems, and these are as follows:

1. More than one spindle can be mounted to the same slide unit while maintaining precision tooling depth (within 0.001 inches) with relation to a locating surface on the workpiece(s). These locating surfaces may have tolerances as large as 0.100 inches to a process dimension.

2. The same principle design is also adaptable to a multi-spindle head, meaning that the capability stated in point 1 above also is obtainable with a multi-spindle head using floating spindles.

3. The floating spindle allows the tooling to reach full depth before the slide unit reaches its stop.

4. The spindle stop is fixed to the rotating tool chuck but the stop does not rotate, hence will not scour the workpiece.

5. It is not necessary to remove the tool chuck for tool change purposes.

6. The tool chuck incorporates a micro-adjusting collar to set the stop depth to the tool cutting edge.

7. Mechanical feed packs can be used with the spindles.

8. Servo motor feed packs, with related gaging and feedback controls, are not required. Hence the manufacturing cost is of the same order as a normal precision drilling spindle.

9. The air/oil cartridge option offers two qualities that cannot be achieved through use of the spring loaded cartridge. First of all, the force created by the air/oil pressure against the cartridge is always constant, since the pressure can be regulated to remain constant, even when the spindle is pushed back to full depth. Secondly, the even pressure distribution around the cartridge holds the spindle concentric to the spindle housing bores. This permits more consistent location of machined holes.

10. The cartridge design permits easy removal in the event of a station rebuild. If interior components of the cartridge become damaged with use (bearings and seals), a spare cartridge can be substituted quickly, without disturbing the station set-up.

11. The spindle stop can be optionally fitted with an air detect circuit to indicate when the tool has reached full depth. This circuit consists of small holes drilled into the stop contact surfaces, through which pressurized air flows. When the stop touches the part surface, the air flow is blocked, and a pressure switch on the air line deactivates the oil/air pressure in the spindle cartridge, to remove the thrust load on the tool. This feature will prolong tool life considerably.

While one embodiment of this invention has been illustrated in the accompanying drawings and described hereinabove, it will be evident to those skilled in the art that changes and modifications may be made therein, without departing from the essence of this invention, as set forth in the appended claims.

The embodiments of the invention in which an exclusive property of privilege is claimed are defined as follows:

1. In combination:
 a housing adapted to be moved rectilinearly in a given direction toward a workpiece, the housing defining a first elongate, interior recess, an elongate cartridge within said first recess, the cartridge defining a second elongate, interior recess,
 an elongate spindle within said second recess,
 first means within the first recess mounting said cartridge for limited axial sliding movement with respect to said housing parallel to said given direction,
 second means restraining the cartridge from rotating with respect to the housing,
 third means within said second recess mounting said spindle for rotation with respect to said cartridge about a rotary axis parallel with said given direction,
 fourth means restraining axial displacement of the spindle with respect to the cartridge,
 a tool chuck fixed to one end of said spindle for movement therewith,
 fifth means on the tool chuck for receiving and supporting a cutting tool for movement with the tool chuck, such that spindle advancement and rotation causes advancement and rotation of the cutting tool about said rotary axis,
 a spindle stop mounted to said tool chuck for relative rotation with respect thereto about said rotary axis, the spindle stop having portions adapted to contact a workpiece,
 sixth means for adjusting the axial position of the spindle stop with respect to the tool chuck,
 seventh means for restraining rotation of the spindle stop with respect to the cartridge, and
 eighth means for urging the spindle and the tool chuck toward the workpiece with respect to the housing.

2. A multi-spindle head containing a plurality of precision depth spindles as claimed in claim 1.

3. The combination claimed in claim 1, in which said cartridge has external regions which are substantially cylindrical and coaxial with said rotary axis, and in which said first means includes axially spaced-apart bushing means surrounding said regions and fixed with respect to the housing.

4. The combination claimed in claim 1, in which said second means includes the provision of a recess on the exterior of the cartridge, an anti-rotation pin extending through a substantially radial bore in the housing and having an end adapted to be received within said recess, and means for releasably securing said pin in a position in which said end is lodged in said recess.

5. The combination claimed in claim 1, in which said third means includes axially spaced-apart bearing means between said spindle and said cartridge.

6. The combination claimed in claim 1, in which said portions on said spindle stop are in the form of two discrete projections, at diametrally opposed locations with respect to said rotary axis.

7. The combination claimed in claim 6, in which each of said projections has an axially disposed orifice such that the orifices are substantially closed upon contact between the projections and a workpiece, the combination further comprising a source of pressurized air, conduit means to feed said pressurized air to said orifices, and detection means for detecting a rise in pressure in the conduit means as a result of contact between the projections and a workpiece, and for generating a signal upon the occurrence of said pressure rise, the combination further including a control means for advancing the housing toward a workpiece, and communicating means for communicating said signal to the control means to allow the latter to halt the forward feed of the housing.

8. The combination claimed in claim 3, in which said portions on said spindle stop are in the form of at least two discrete projections at symmetrically spaced locations with respect to said rotary axis, each of said projections having an orifice such that the orifices are substantially closed upon contact between the projections and a workpiece, the combination further comprising a source of pressurized air, conduit means to feed such pressurized air to said orifices, and detection means for detecting a rise in pressure in the conduit means as a result of contact between the projections and a workpiece, and for generating a signal upon the occurrence of said pressure rise, to indicate that full cutting depth has been achieved.

9. The combination claimed in claim 1, in which said sixth means includes a threaded connection between the spindle stop and the tool chuck, and a locking pin adapted to lock the spindle stop with respect to the tool chuck in any selected position.

10. The combination claimed in claim 1, in which said seventh means includes a plurality of retaining fingers each having a first portion engaging the spindle stop and a second portion secured by threaded fastener means with respect to the cartridge in such a way as to be axially adjustable with respect to the cartridge.

11. The combination claimed in claim 1, in which said eighth means comprises a compression coil spring urging the spindle and the tool chuck towards the workpiece with respect to the housing.

12. The combination claimed in claim 1, in which said eighth means includes the provision of pressurized fluid within a sealed annular space between the housing and the cartridge.

13. The combination claimed in claim 1, in which said cartridge has external regions which are substantially cylindrical and coaxial with said rotary axis, and in which said first means includes axially spaced-apart bushing means surrounding said regions and fixed with respect to the housing; and further in which said second means includes the provision of a recess on the exterior of the cartridge, an anti-rotation pin extending through a substantially radial bore in the housing and having an end adapted to be received within said recess, and means for releasably securing said pin in a position in which said end is lodged in said recess; and further in which said third means includes axially spaced-apart bearing means between said spindle and said cartridge; and further in which said portions on said spindle stop are in the form of two discrete projections at diametrally opposed locations with respect to said rotary axis; and further in which each of said projections has an orifice such that the orifices are substantially closed upon contact between the projections and a workpiece, the combination further comprising a source of pressurized air, conduit means to feed such pressurized air to said orifices, and detection means for detecting a rise in pressure in the conduit means as a result of contact between the projections and a workpiece, and for generating a signal upon the occurrence of said pressure rise, the combination further including a control means for advancing the housing toward a workpiece, and communicating means for communicating said signal to the control means to allow the latter to halt the forward feed of the housing; and further in which said sixth means includes a threaded connection between the spindle stop and the tool chuck, and a locking pin adapted to lock the spindle stop with respect to the tool chuck in any selected position; and further in which said seventh means includes a plurality of retaining fingers each having a first portion engaging the spindle stop and a second portion secured by threaded fastener means with respect to the cartridge in such a way as to be axially adjustable with respect to the cartridge.

14. A multi-spindle head containing a plurality of cartridges, spindles, tool chucks and spindle stops, as claimed in claim 3, claim 8 or claim 13.

15. The combination claimed in claim 1, claim 8 or claim 13, in which said first means limits said axial sliding movement to a maximum not greater than about 0.06 inches.

* * * * *

UNITED STATES PATENT AND TRADEMARK OFFICE
CERTIFICATE OF CORRECTION

PATENT NO. : 5,277,523
DATED : January 11, 1994
INVENTOR(S) : Joel Jones

It is certified that error appears in the above-indentified patent and that said Letters Patent is hereby corrected as shown below:

Title page, col. 2, line 2 , Attorney, Agent, or Firm - change "Shoemaker and Mattarie, Ltd." to -- Shoemaker and Mattare, Ltd.--

Signed and Sealed this

Nineteenth Day of July, 1994

Attest:

BRUCE LEHMAN

Attesting Officer     *Commissioner of Patents and Trademarks*